No. 764,009.

E. S. ROBERTS.
RUBBER TIRE.
APPLICATION FILED NOV. 16, 1903.

NO MODEL.

WITNESSES:
C. H. Bertholf
Adele Opler

INVENTOR
Edmund S. Roberts.

BY
Garry P. Van Gorge
ATTORNEY

No. 764,009. Patented July 5, 1904.

UNITED STATES PATENT OFFICE.

EDMUND S. ROBERTS, OF NEW YORK, N. Y.

RUBBER TIRE.

SPECIFICATION forming part of Letters Patent No. 764,009, dated July 5, 1904.

Application filed November 16, 1903. Serial No. 181,353. (No model.)

*To all whom it may concern:*

Be it known that I, EDMUND S. ROBERTS, a subject of the King of Great Britain, residing at New York, in the county and State of New York, have invented a new and useful Rubber Tire, of which the following is a specification.

This invention relates to rubber tires, and especially to holding devices therefor; and the object of the invention is to provide simple and effective means to secure the rubber tire in position on a wheel.

The invention is illustrated in the accompanying drawings, in which—

Figure 1:
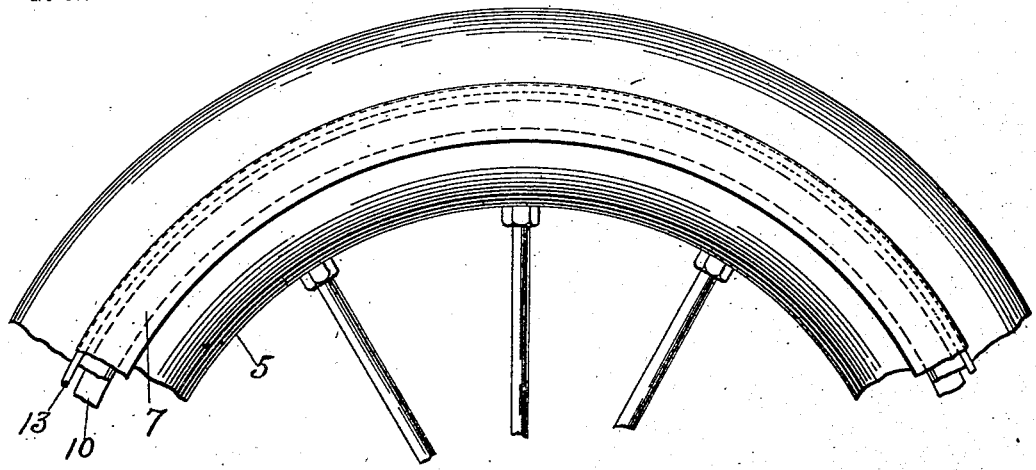
Figure 2:
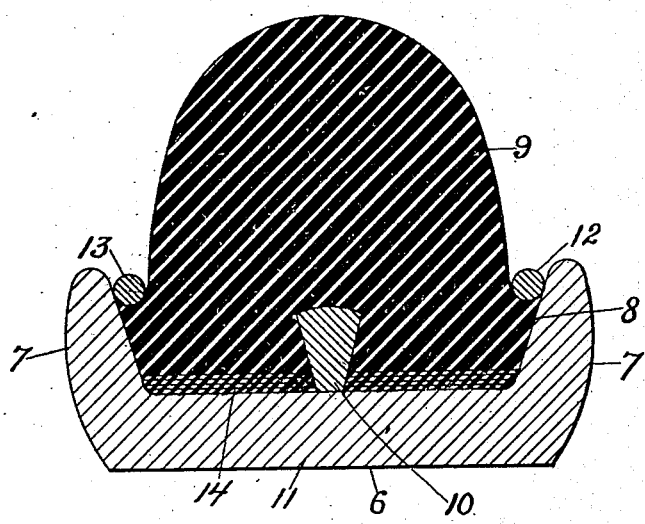

Figure 1 is a side view of a portion of a wheel with my improved tire applied thereto; and Fig. 2 is a cross-section thereof, on an enlarged scale.

In the accompanying drawings like numerals of reference refer to the same parts in each of the views, and in the practice of my invention I provide a wheel 5 with a channel-iron 6, having side flanges 7, the inner sides of which are downwardly and inwardly inclined, as shown at 8, so that the flanges when viewed from the base thereof are flaring in form with practically flat inner walls. Within this channel I mount a rubber tire 9, having a V-shaped groove formed centrally of the base thereof, in which is mounted a retaining-ring 10 in the shape of a truncated V, the small end of which rests upon the base 11 of the channel-iron 6, it being understood that the ends of this ring are brazed or otherwise secured together, so as to form a continuous ring around the wheel. On the exterior of the tire 9 and on each side thereof within the plane of the periphery of the flanges 7 I mount two wire rings 12 and 13, which are made sufficiently small in diameter to compress the rubber of the tire underneath the same for the purpose hereinafter described.

The operation is as follows: The tire is mounted within the channel 6, and the ends of the ring 10 are then secured together, after which the wires 12 and 13 are placed in position, and when the ends are secured together the rubber is compressed, as hereinbefore mentioned, thereby forcing the rubber of the tire downward, and as the sides 8 of the flanges 7 are inclined downwardly and inwardly the rubber of the tire will also be forced downwardly and inwardly and will be compressed underneath the side walls of the V-shaped ring 10, thereby bringing the rubber in very close contact with the side walls of this ring 10, and as this ring is wider at the top than at the base the tire cannot be unseated from the channel without further compressing the rubber between the ring 10 and the flanges 7, as will be readily understood. In order to further increase the resistance of this rubber between the ring 10 and the flanges 7, I may use stiffening material 14 in the base of the tire 9 in a manner well known.

While I have shown the rings 12 and 13 on the exterior of the rubber tire, it is evident that these might be molded within the tire and still operate substantially in the same way. It is also evident that the ring 10 may be mounted within the channel before the tire and be forced into the groove in the base of the tire as the tire is placed in position.

Having thus described my invention, what I claim as new, and desire to secure by Letters Patent of the United States, is—

1. The combination with a vehicle-wheel of a channel-iron having flaring flanges, a rubber tire mounted therein a V-shaped retaining-ring in the base thereof, and means to compress a portion of the rubber downwardly and inwardly against the side walls of said ring, for the purpose set forth.

2. The combination with a vehicle-wheel of a channel-iron having flaring flanges, a rubber tire mounted therein, a V-shaped retaining-ring molded in the base of said tire, and wire retaining-rings within said channel compressing the rubber between the said flanges and retaining-ring, for the purpose set forth.

3. The herein-described rubber tire comprising the combination of a channel-iron having flaring side flanges, a rubber tire mounted therein, a V-shaped retaining-ring molded in the base thereof, and retaining-rings mounted within the plane of the periphery of said flange, and compressing the rubber of the tire downwardly and inwardly against the sides of said V-shaped retaining-ring, substantially as for the purpose set forth.

4. The herein-described rubber tire comprising the combination of a channel-iron having flaring side flanges, a rubber tire mounted therein, a V-shaped retaining-ring molded in the base thereof, and retaining-rings mounted within the plane of the periphery of said flange, and compressing the rubber of the tire downwardly and inwardly against the sides of said V-shaped retaining-ring, said tire having stiffening ial in the base thereof, as for the purpos se forth.

In testimony whereof I have hereunto subscribed my name in the presence of two subscribing witnesses.

EDMUND S. ROBERTS.

Witnesses:
ADELE OPLER,
L. D. DE SAUSSURE.